US010440435B1

(12) United States Patent
Erdmann et al.

(10) Patent No.: US 10,440,435 B1
(45) Date of Patent: Oct. 8, 2019

(54) PERFORMING SEARCHES WHILE VIEWING VIDEO CONTENT

(71) Applicant: Amazon Technologies, Inc., Seattle, WA (US)

(72) Inventors: David James Roy Erdmann, Edmonds, WA (US); Amber Autrey Taylor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/858,045

(22) Filed: Sep. 18, 2015

(51) Int. Cl.
| | |
|---|---|
| *H04N 21/45* | (2011.01) |
| *H04N 21/466* | (2011.01) |
| *H04N 21/81* | (2011.01) |
| *H04N 21/4722* | (2011.01) |
| *H04N 21/431* | (2011.01) |
| *H04N 21/458* | (2011.01) |
| *H04N 21/462* | (2011.01) |
| *H04N 21/478* | (2011.01) |
| *H04N 21/44* | (2011.01) |
| *H04N 21/422* | (2011.01) |
| *H04N 21/4223* | (2011.01) |
| *H04N 21/433* | (2011.01) |

(52) U.S. Cl.
CPC ..... *H04N 21/4722* (2013.01); *H04N 21/4223* (2013.01); *H04N 21/42203* (2013.01); *H04N 21/4316* (2013.01); *H04N 21/4333* (2013.01); *H04N 21/44008* (2013.01); *H04N 21/458* (2013.01); *H04N 21/4622* (2013.01); *H04N 21/47815* (2013.01); *H04N 21/8133* (2013.01)

(58) Field of Classification Search
CPC ............. H04N 21/812; H04N 21/4755; H04N 21/47815; H04N 21/472; H04N 21/44222; H04N 21/4722; H04N 21/23418; H04N 5/23206; H04N 21/8133; H04N 21/44008; H04N 1/00411; H04N 1/00458; H04N 21/431; H04N 21/4312; H04N 21/4223; H04N 21/4333; H04N 21/42203; H04N 21/458; H04N 21/4316; H04N 21/4622; G06F 3/0488
See application file for complete search history.

(56) References Cited

U.S. PATENT DOCUMENTS

| | | | | |
|---|---|---|---|---|
| 2010/0082768 | A1* | 4/2010 | Edwards | .................. H04N 7/24 709/217 |
| 2013/0103383 | A1* | 4/2013 | Du | ........................ G06F 3/0488 704/3 |
| 2013/0132515 | A1* | 5/2013 | Mostafa | .................. H04L 67/32 709/217 |
| 2013/0173635 | A1* | 7/2013 | Sanjeev | ............ G06F 17/30825 707/748 |
| 2013/0174195 | A1* | 7/2013 | Witenstein-Weaver | ..................... H04N 21/4722 725/32 |

(Continued)

*Primary Examiner* — Pankaj Kumar
*Assistant Examiner* — Alazar Tilahun
(74) *Attorney, Agent, or Firm* — Thomas | Horstemeyer, LLP

(57) ABSTRACT

Disclosed are various embodiments for performing searches while users are viewing video content. An explicit request from a user to initiate a search relative to video content is detected. An item in the video content is identified. The search is executed in a database to obtain information regarding the item. The information is presented to the user.

20 Claims, 6 Drawing Sheets

(56) References Cited

U.S. PATENT DOCUMENTS

| 2013/0347018 A1* | 12/2013 | Limp ................ H04N 21/4826 |
| | | 725/19 |
| 2014/0111687 A1* | 4/2014 | Difrancesco ..... H04N 21/25891 |
| | | 348/468 |
| 2015/0264450 A1* | 9/2015 | Jung ................ H04N 21/23418 |
| | | 725/32 |

* cited by examiner

PERFORMING SEARCHES WHILE VIEWING VIDEO CONTENT

BACKGROUND

Users may be interested in learning more about what they are seeing or hearing when watching video content, such as a movie or television program. A user might write down a topic of interest and later enter keywords related to the topic of interest into a search engine via a web browser. Sometimes users may forget or lose interest in the topic by the time playback of the video content is over.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to performing searches while a user is viewing video content. A user who is viewing video content such as a movie, television program, video clip, and so on, may be interested in a product, person, or place that is currently being depicted or discussed in the video content. The user may seek additional information or may be interested in products that are relevant to what is depicted or discussed. Typically, the user would have to come up with a search query describing the product, person, or place, and then the user would have to enter the search query into a search application. Such practices can be problematic.

First, the user may not be able to accurately identify the product, person, or place that is depicted in such a way as to obtain relevant search results. For example, if the user sees a particular white dress that a person is wearing in a movie, the user may not be able to describe it with sufficient specificity (e.g., brand or designer, fabric, style, etc.) to obtain information about that particular white dress. Entering a search for "white dress" in a product search engine is likely to produce thousands of search results, most of which may not even resemble the white dress from the movie.

Second, even if the user were to formulate an effective search query, performing a search while watching video content can be inconvenient. For example, the user may have to retrieve a smartphone or other mobile device and manually enter the search query into an application. Such an action takes time and can distract the user from the movie. If the user puts off performing the search until playback of the video content is over, the user may forget the search or lose interest.

Various embodiments of the present disclosure facilitate convenient searching while users are viewing video content. Several approaches will be discussed for determining that a user would like to perform a search relative to the video content. Upon determining that a user has requested a search, items depicted, discussed, or otherwise associated with the video content are identified through an automatic and/or manually assisted process. A search of a database can then be executed for the items. The search produces additional information about the items or a listing of products relevant to the items. This information can be presented in a user interface on the same display as the video content or on a secondary display while the video content is being rendered.

Figure 1:
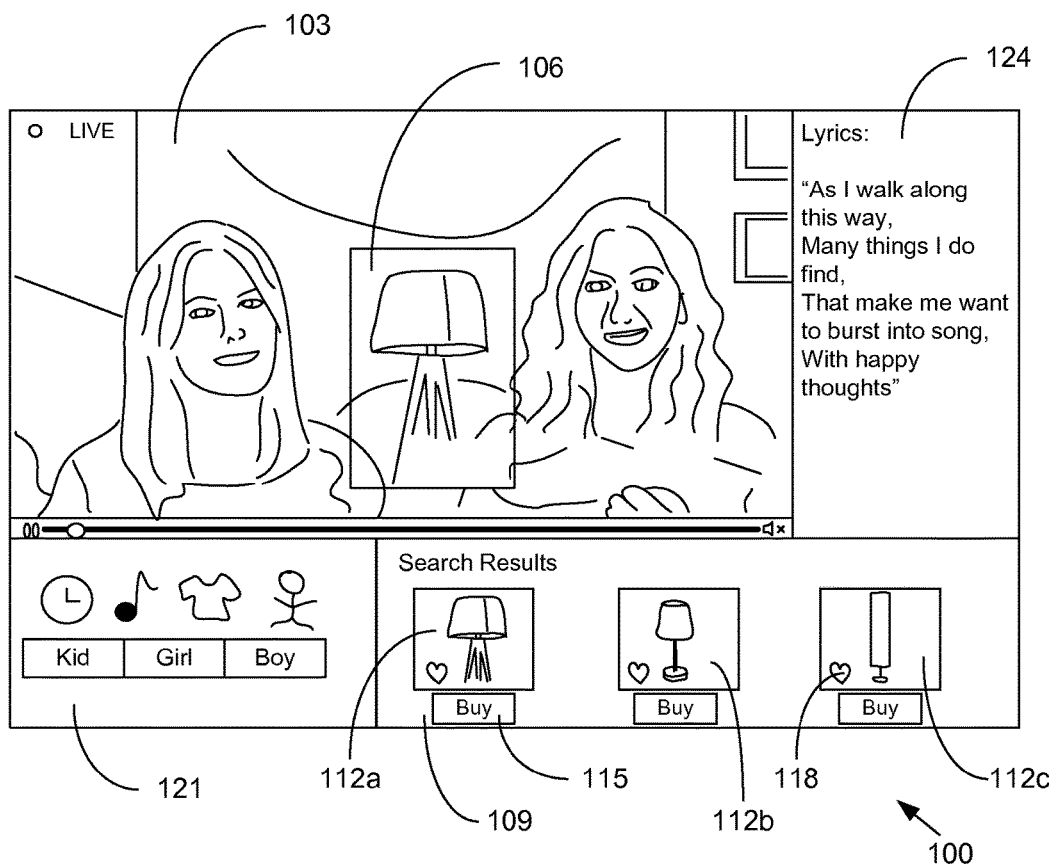
FIG. 1 is one example of a user interface rendered according to various embodiments of the present disclosure.

Turning now to FIG. 1, shown is one example of a user interface 100 rendered according to various embodiments. The user interface 100 presents video content 103 with respect to which a user has requested a search. It is noted that the video content 103 may be live or recorded. The user interface 100 indicates a search region 106 in the video content 103 that corresponds to a search item of interest. The search region 106 may be automatically detected or may be specified by the user. In some cases, multiple search regions 106 may be detected or specified, and the user may select from multiple detected search regions 106.

With respect to the search region 106, the item depicted in the search region 106, a lamp in this example, has been automatically identified and used to formulate a search query for additional information. A highlighting overlay (e.g., a box, shading) may indicate that the user has already purchased the identified item. In this case, a search results panel 109 is presented in the user interface 100 to showcase the search results for the search query. For example, three search results 112*a*, 112*b*, and 112*c* are presented. Different quantities of search results 112 may be presented in other examples, and the search results panel 109 may allow for scrolling of the viewport or may include a "shoveler" widget that enables a larger list of search results 112 to be browsed in the search results panel 109.

The search results 112 may include the actual item depicted or discussed in the video content 103 or may otherwise be relevant to that item. The search results 112 may include, for example, images, titles, prices, availability information, whether the item qualifies for a special shipping status, and/or other information. In this case, the search result 112*a* is an exact match to what is shown, while search results 112*b* and 112*c* are similar or related items that may be determined through text matching of a search query (e.g., "modern lamp"). Collaborative filtering may also be used to determine relevant items (e.g., "people who bought X also bought Y," "people who viewed X also viewed Y," etc.). Components 115, such as a "buy" button, may enable the corresponding item to be ordered or added to a shopping list.

Components 118, such as a heart button or toggle, may enable the corresponding item to be added to or removed from a wish list, favorites list, or other lists.

A control panel 121 may include various icons, buttons, or other interface components that control the search being performed and the information being displayed. For example, selection of a music note icon in the control panel 121 may cause lyrics for a music track currently being played in the video content 103 to be shown in a lyrics panel 124 of the user interface 100. Selection of a stick figure icon may cause information about a person shown in the video content 103 to be presented. Selection of a clock icon may cause information about the time or place of the video content 103 to be presented. Selection of a shirt icon may cause information about products shown in the video content 103 to be presented. Selection of a "kid," "girl," or "boy" control may cause the search results 112 to be personalized or filtered for corresponding limited demographics. Other filters such as for compatibility with existing purchases may be enabled. In the following discussion, a general description of the system and its components is provided, followed by a discussion of the operation of the same.

Figure 2:
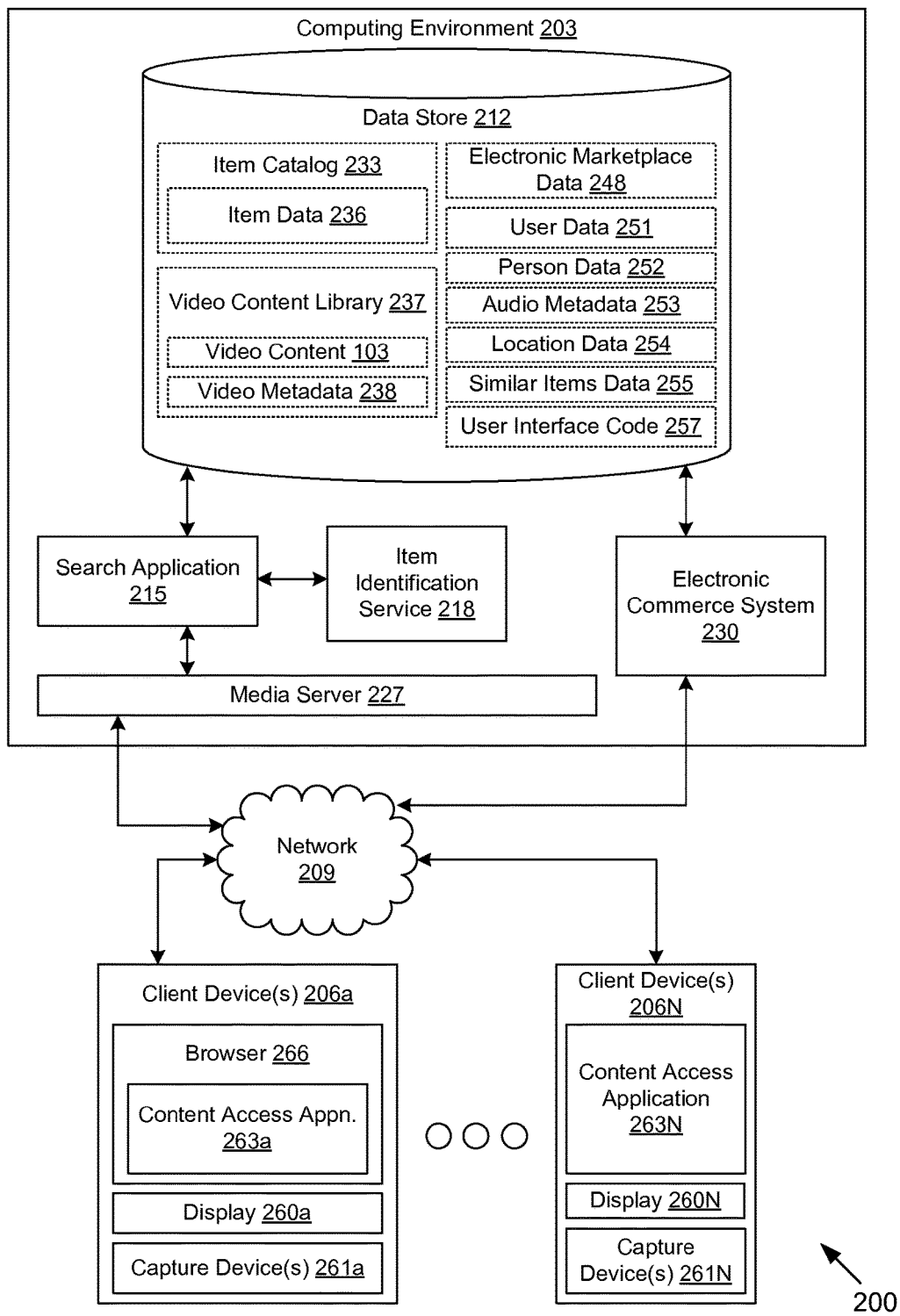
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of client devices 206a . . . 206N, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a search application 215, an item identification service 218, a media server 227, an electronic commerce system 230, and other applications, services, processes, systems, engines, or functionality not discussed in detail herein. The search application 215 is executed to facilitate searching for additional information relative to video content 103 (FIG. 1) being presented to the user. The search application 215 may generate the user interface 100 (FIG. 1) encoded in a video stream or may send data to the client devices 206 to enable applications executed on the client devices 206 to generate the user interface 100.

The search application 215 may communicate with the item identification service 218 in order to identify one or more items being spoken about, depicted in, or otherwise associated with currently presented video content 103. The item identification service 218 may utilize metadata associated with the video content 103 to identify the item(s). In some cases, the item identification service 218 may execute audio recognition and/or image recognition processes applied relative to one or more frames of the video content 103 to identify the item(s).

The media server 227 may be configured to send video data and interface data created by the search application 215 to the client devices 206. For example, the media server 227 may comprise a commercially available hypertext transfer protocol (HTTP) server. The media server 227 may serve data via HTTP, real-time transfer protocol (RTP), real-time streaming protocol (RTSP), or other protocols.

The electronic commerce system 230 is executed in order to facilitate the online order of items over the network 209 through an electronic marketplace in which one or more sellers participate. The electronic marketplace may be operated by a proprietor who may also be a seller. The electronic commerce system 230 also performs various backend functions associated with the online presence of a seller in order to facilitate the online order of items. For example, the electronic commerce system 230 may generate network content such as web pages, mobile application data, or other forms of content that are provided to client devices 206 for the purposes of selecting items for purchase, rental, download, lease, or other forms of consumption.

The data stored in the data store 212 includes, for example, an item catalog 233 storing item data 236, a video content library 237 that stores video content 103 and video metadata 238, electronic marketplace data 248, user data 251, person data 252, audio metadata 253, location data 254, similar items data 255, user interface code 257, and potentially other data. The item catalog 233 includes data regarding items offered for order through the electronic commerce system 230. Such items may include products, goods, services, digital content, and/or other items. The item data 236 may include titles, descriptions, weights, prices, quantities available, export restrictions, customer reviews, customer ratings, images, videos, version information, availability information, shipping information, and/or other data.

The video content library 237 includes video content 103 such as movies, television shows, video clips, and/or other forms of video content 103. Although described as "video content," it is understood that the video content 103 may include accompanying audio, closed captioning text, and/or other data. In some cases, the video content 103 may be a live stream and may not be stored in the data store 212.

The video metadata 238 may include various information associated with the video content 103. This information may be time coded such that it is associated with specific frames or regions in frames of the video content 103. The video metadata 238 may indicate items shown in the video content 103, locations where the video content 103 was filmed or settings indicated by the storyline of the video content 103, people who appear in the video content 103, time periods at which the video content 103 takes place, and so on. In one embodiment, the video metadata 238 may be aggregated from feeds supplied by multiple third-party suppliers of video metadata 238.

The electronic marketplace data 248 includes data relating to offers of items for order or preorder via an electronic marketplace implemented by the electronic commerce system 230. The user data 251 may include personal information of a user such as account information, order history, browse history via the electronic commerce system 230, items seen via the interactive shopping interface, video segments viewed, chat history, personalization preferences, and/or other data.

The person data 252 includes data regarding people that may appear in or be referenced by the video content 103. For example, the person data 252 may include the name, character information, images, and other data describing cast members who perform in the video content 103 or crew members who are involved in the production of the video content 103. The person data 252 may also include biographies or filmographies of the performers, relationships with other people, and/or other data.

The audio metadata 253 may include data regarding audio tracks featured in the video content 103. For example, the audio metadata 253 may include lyrics, data regarding performers, data regarding songwriters or composers, profile data that enables automatic recognition of audio tracks, and so on. The location data 254 may provide additional information about locations featured in the video content 103. In one example, the location data 254 may associate items or products with specific locations.

The similar items data 255 relates items as similar or relevant to other items. Such data may be generated, for example, through collaborative filtering processes. Through an analysis of browse histories and/or order histories, it may be determined that items are similar to one another (e.g., people who ordered X also ordered Y, people who viewed X also viewed Y, etc.).

The user interface code 257 is used to implement the user interface 100. To this end, the user interface code 257 may include code executable on the client device 206. The user interface code 257 may include hypertext markup language (HTML) data, JavaScript data, dynamic HTML (DHTML) data, video player code, and other data.

The client devices 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client devices 206 may include a display 260a . . . 260N. The displays 260 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client devices 206 may also include one or more capture devices 261a . . . 261N such as image cameras, video cameras, microphones, three-dimensional video capture devices, and other capture devices.

The client devices 206 may be configured to execute various applications such as a content access application 263a . . . 263N and/or other applications. The content access application 263 may be executed in a client device 206, for example, to access network content served up by the computing environment 203 and/or other servers, thereby rendering a user interface 100 (FIG. 1) on the display 260. To this end, the content access application 263 may comprise a dedicated application as with client device 206N, or the content access application 263 may be executed in a browser 266, as is the case with client device 206a. The client devices 206 may be configured to execute applications beyond the content access application 263 and the browser 266 such as, for example, email applications, social networking applications, word processors, spreadsheets, and/or other applications.

Figure 3:
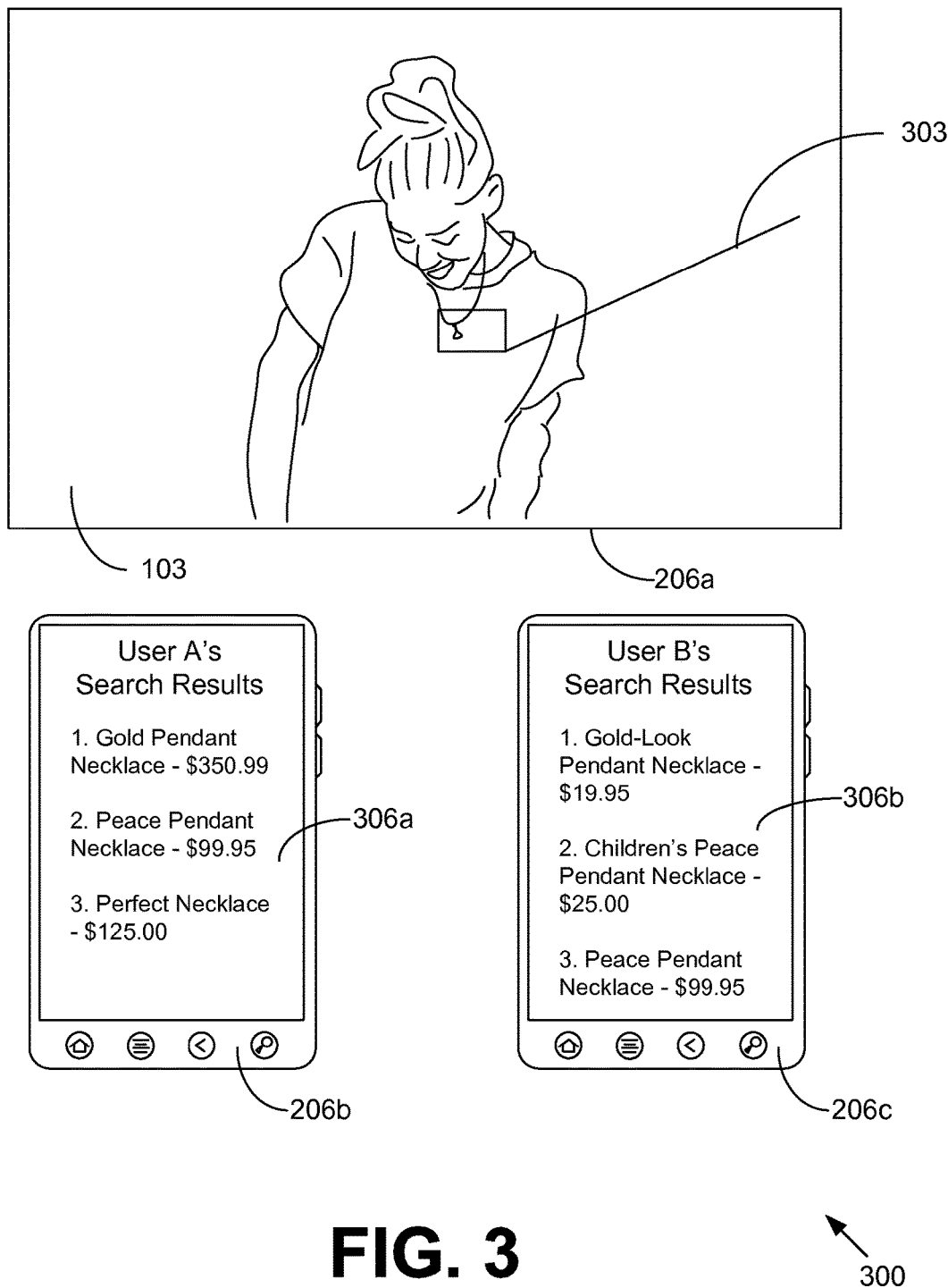
FIG. 3 is a drawing of an example scenario where multiple users are watching video content on a client device in the networked environment of FIG. 2 while receiving personalized search results on their respective client devices in the networked environment of FIG. 2 according to various embodiments of the present disclosure.

Referring next to FIG. 3, shown is a drawing of an example scenario 300 where multiple users are watching video content 103 on a client device 206a while receiving personalized search results on their respective client devices 206b and 206c. For example, assume user A and user B are both watching a television program rendered by a television corresponding to the client device 206a. User A then indicates an intent to perform a search relative to the current video content 103. The search application 215 (FIG. 2) determines that the item shown at the region 303 is being presented.

The search application 215 may be aware that both user A and user B are watching the same video content 103 and are associated with respective client devices 206b and 206c. Thus, in this example, the search application 215 may generate personalized search results relating to the identified item for each user. The search results 306a rendered by the client device 206b are customized for user A, who may be profiled to be an adult. By contrast, the search results 306b rendered by the client device 206c are customized for user B, who may be profiled as a child. In this example, the search results 306b may be weighted toward children's or costume jewelry in lieu of more expensive adult jewelry. Specific search results may be shared among the search results 306a and 306b depending on their corresponding relevance. For example, the exact item shown in the region 303 may be shown in both sets of search results 306a and 306b.

Figure 4:
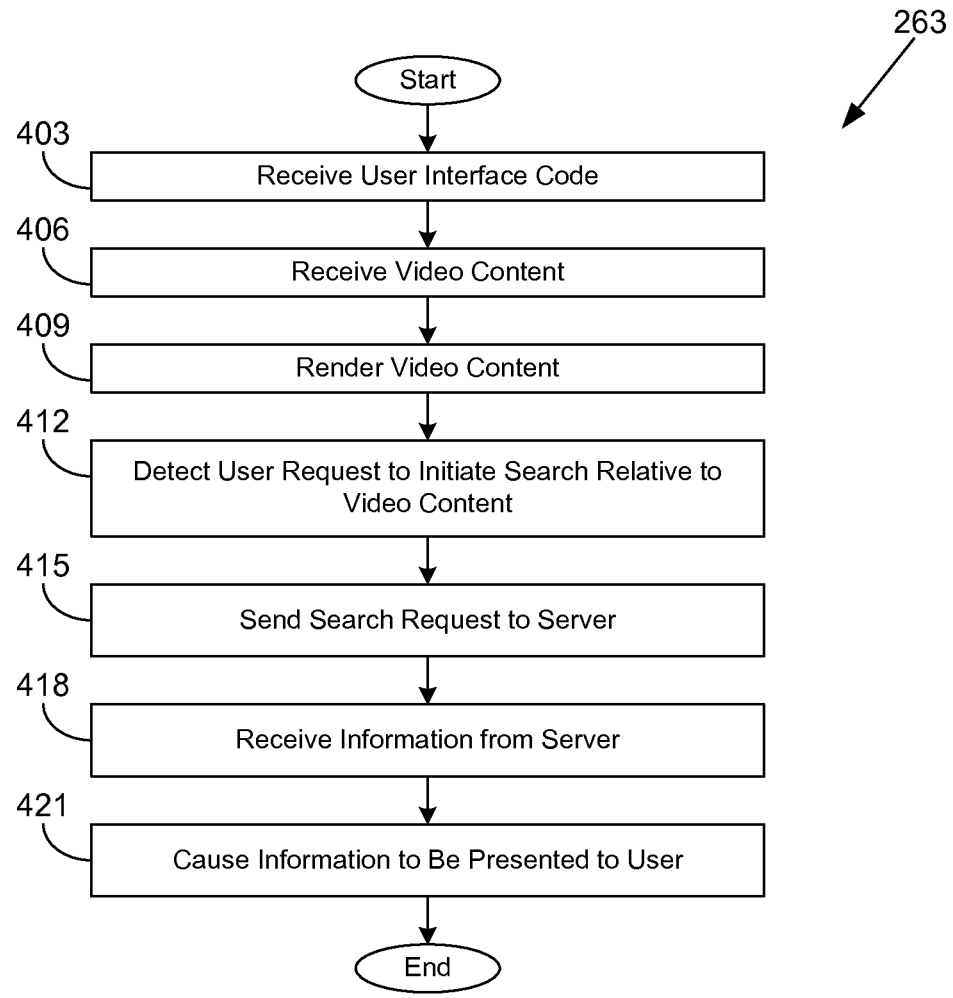
FIG. 4 is a flowchart illustrating one example of functionality implemented as portions of a content access application executed in a client device in the networked environment of FIG. 2 according to various embodiments of the present disclosure.

Referring next to FIG. 4, shown is a flowchart that provides one example of the operation of a portion of the content access application 263 according to various embodiments. It is understood that the flowchart of FIG. 4 provides merely an example of the many different types of functional arrangements that may be employed to implement the operation of the portion of the content access application 263 as described herein. As an alternative, the flowchart of FIG. 4 may be viewed as depicting an example of elements of a method implemented in a client device 206 (FIG. 2) according to one or more embodiments. It is noted that the following tasks may be performed in one or more client devices 206. In some cases, a user may view video content 103 on one client device 206 such as a television or other "living room device," and control the playback of the video content 103, control searches, and/or view search results via another client device 206 such as a smartphone or other mobile device.

Beginning with box 403, the content access application 263 receives user interface code 257 (FIG. 2) from the media server 227 (FIG. 2). In other embodiments, the content access application 263 may be a special-purpose application that is preconfigured to generate user interfaces like the user interface 100 (FIG. 2). Alternatively, the user interface code 257 may be cached in the client device 206.

In box 406, the content access application 263 receives video content 103 (FIG. 2) from the media server 227. For example, a user at the client device 206 may request that a certain video title be played. In some embodiments, the video content 103 may be received from a third-party provider or via an over-the-air television stream. In box 409, the content access application 263 renders the received video content 103 upon a display 260 (FIG. 2).

In box 409, the content access application 263 detects a request by a user to initiate a search relative to the video content 103. This may occur while the video content 103 is being played back or rendered by the client device 206. Numerous different approaches may be used to detect that a user has an intent to initiate a search, with a goal being to make initiating a search easy and unobtrusive as possible for users who are currently viewing video content 103.

On a client device 206 that renders the video content 103 on a touchscreen, an intent to search may be detected via a simple press for a period of time, multiple presses, based on firmness of the press, circling an item in the video content 103 to be searched, tracing a specific gesture, or other user input. Where the client device 206 includes a capture device 261 (FIG. 2) such as a camera or a three-dimensional camera, physical gestures by the user may be monitored. Motions such as rubbing fingers together and facial expressions may express an intent to search. Such motions and expressions may be configurable and may be created by the user. Where the client device 206 includes a capture device 261 such as a microphone, a verbal command or making a specific noise (e.g., snapping fingers) may express an intent to search. A user may choose to opt-out of the monitoring by the capture device 261 for privacy reasons. Where a different client device 206 renders the video content 103, the user may open a content access application 263 via a second screen display and request a search.

In box 415, the content access application 263 sends the search request to the media server 227. The search request may define or specify context associated with the search request, such as an identification of the video content 103 being rendered, the current frame or frames in the video content 103, a region in one or more frames of the video content 103 corresponding to where an intent to search was expressed, and so on. Other information may include an identification of the user, the user location, what the user is doing after expressing the intent to search, what applications are loaded by the user, user preferences, and so on. In some cases, the content access application 263 may send a screenshot of at least a portion of a frame of the video content 103 to the media server 227 for analysis. In some cases, the video content 103 may be sent to the client device 206 along with the video metadata 238 (FIG. 2) and the content access application 263 may identify a specific item that the user has selected from the video metadata 238 for the search.

In box 418, the content access application 263 receives information from the media server 227, generated by the search application 215 (FIG. 2). This information can include additional information regarding the identified item and/or a result set of items that are relevant to the identified item and available via the electronic commerce system 230 (FIG. 2). In box 421, the content access application 263 causes the received information to be presented to the user. The received information may be presented by the same client device 206 that is rendering the video content 103 or by a different client device 206 (i.e., a second screen). In one scenario, playback of the video content 103 may be paused for presentation of the information. In another scenario, playback of the video content 103 continues while the information is presented. Thereafter, the operation of the portion of the content access application 263 ends.

Figure 5:
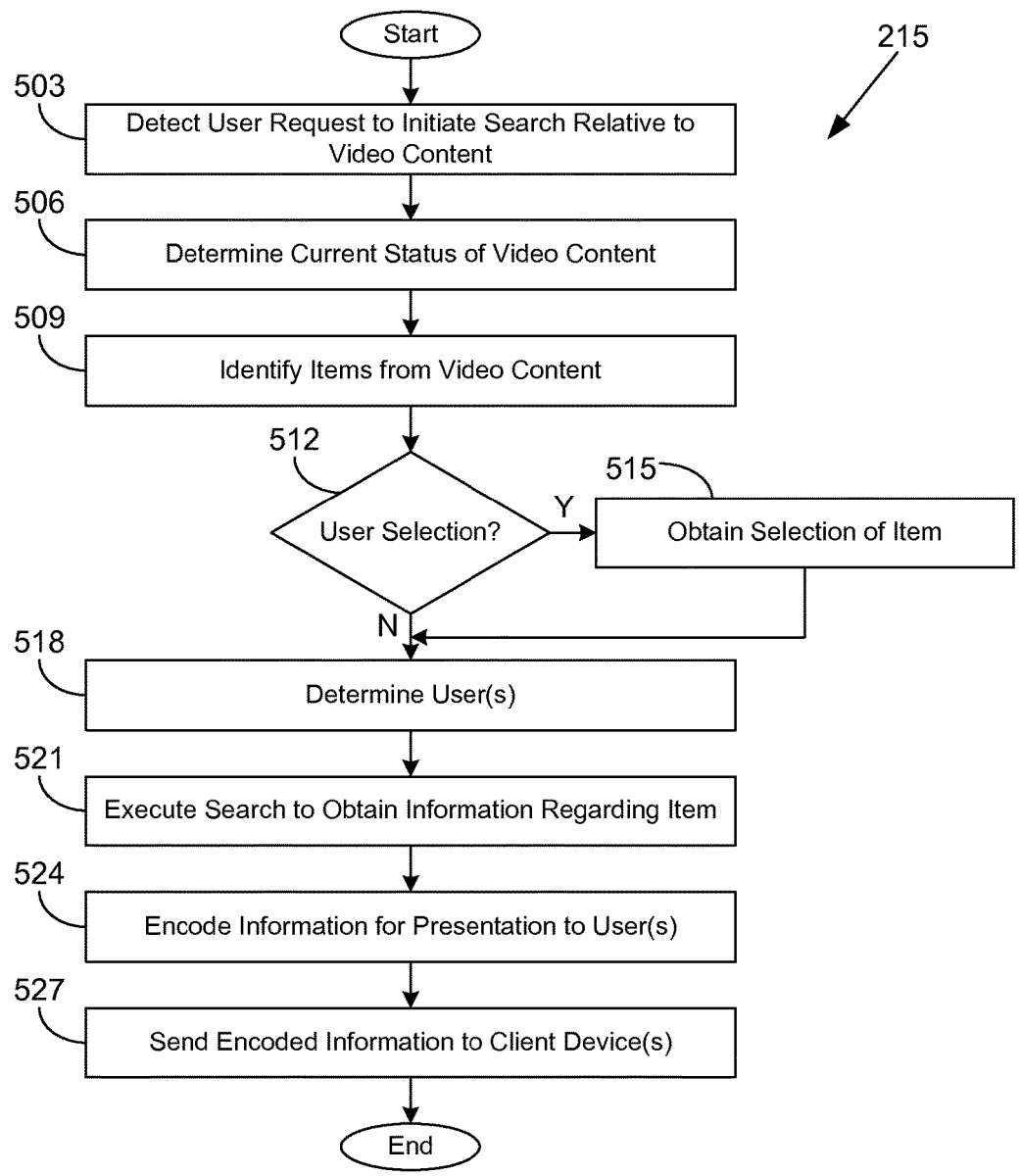
FIG. 5 is a flowchart illustrating one example of functionality implemented as portions of a search application executed in a computing environment in the networked environment of FIG. 2 according to various embodiments of the present disclosure.

Continuing to FIG. 5, shown is a flowchart that provides one example of the operation of a portion of the search application 215 according to various embodiments. It is understood that the flowchart of FIG. 5 provides merely an example of the many different types of functional arrangements that may be employed to implement the operation of the portion of the search application 215 as described herein. As an alternative, the flowchart of FIG. 5 may be viewed as depicting an example of elements of a method implemented in the computing environment 203 (FIG. 2) according to one or more embodiments.

Beginning with box 503, the search application 215 detects a user request to initiate a search relative to video content 103 (FIG. 2). The user request may involve some explicit action performed by the user to trigger the search. The detection may be performed server-side based on various user input, or client-side and reported back to the search application 215. In box 506, the search application 215 determines the current status of the video content 103. For example, the search application 215 may determine the current frame or time in the video content 103 as rendered by the client device 206 (FIG. 2). This information may be determined from status maintained server-side by the media server 227 (FIG. 2) or may be reported by the client device 206.

In box 509, the search application 215 identifies one or more items featured in the video content 103. Such items may correspond to people, places, products, events, writing, brands, actions, emotions, animals, sports, music, concerts, and so on, that are shown, discussed, or otherwise associated with the video content 103. To this end, the search application 215 may send a request to the item identification service 218 (FIG. 2) to analyze and identify items from one or more video frames or from an audio track accompanying the video content 103. In one embodiment, the client device 206 may submit a video screenshot for analysis by the item identification service 218. Where the video content 103 includes dialogue, the item identification service 218 may determine the dialogue from the video content 103 and then analyze the dialogue to identify an item.

In box 512, the search application 215 determines whether to obtain a user selection. For example, multiple items may be detected in the video content 103, and it may be helpful to obtain a user selection as for which item the search should be performed. If so, the search application 215 continues to box 515 and obtains a selection of the item from a user via the client device 206. The search application 215 then moves to box 518. If no user selection is needed, the search application 215 proceeds directly to box 518 from box 512.

In box 518, the search application 215 determines the users who are associated with the search request. Multiple users may be watching video content 103 (e.g., on a living-room device) and may each have their own client devices 206 (e.g., smartphones). The users can be determined based at least in part on a customer identifier, a cookie identifier, a mobile device number, an internet protocol (IP) address, and/or other data. In box 521, the search application 215 executes a search upon one or more databases in the data store 212 (FIG. 2) to obtain information regarding the item. The search may involve a search of person data 252 (FIG. 2), audio metadata 253 (FIG. 2), location data 254 (FIG. 2), similar items data (FIG. 2), the item catalog 233 (FIG. 2), and/or other data. The search results may be personalized for each of the determined users. That is to say, the search results may be filtered based upon parameters indicating what the users might like or prefer. For example, if a user has a preferred size defined in the user data 251 (FIG. 2), that size may be used as a parameter in the search. In some cases, the search application 215 may query one or more search engines operated by third parties using a search query formulated from the identified item. In one embodiment, if a product logo is visible in the video content 103, products from that corresponding brand will be ranked higher in the results. In some embodiments, brands may pay for their items to be ranked higher in the results.

In box 524, the search application 215 encodes the information from the search for presentation to the users. For example, all or some of the information may be encoded for presentation to the user as an overlay on top of at least a portion of the video content 103. In some cases, the video content 103 may be encoded into a stream with the information overlaying or embedded into the video content 103. In box 527, the search application 215 sends the encoded information to one or more client devices 206 associated with the respective users. Where there are multiple users and multiple client devices 206, a personalized set of search results may be sent to the client device 206 associated with each respective user. Whether the users act upon the search results (e.g., by adding an item to a shopping list) may be recorded and used to improve the relevancy of future search results via a machine learning approach. Thereafter, the operation of the portion of the search application 215 ends.

Figure 6:
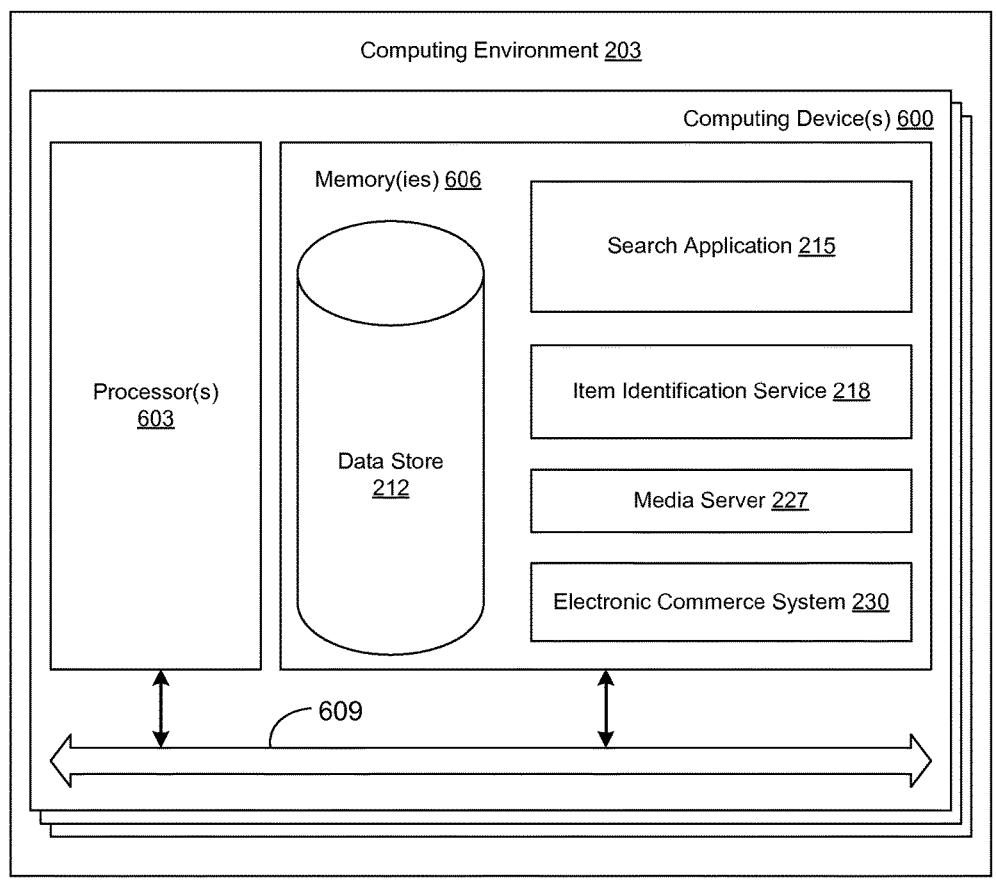
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the search application 215, the item identification service 218, the media server 227, the electronic commerce system 230, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the search application 215, the item identification service 218, the media server 227, the electronic commerce system 230, the content access application 263 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the search application 215 and the content access application 263. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search application 215, the item identification service 218, the media server 227, the electronic commerce system 230, and the content access application 263, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the search application 215, the item identification service 218, the media server 227, the electronic commerce system 230, and the content access application 263, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   render video content upon a first display of a first client device;
   while the video content is being rendered, detect an explicit request from a user to initiate a search of a particular area in the video content based at least in part on a touch gesture detected on the first display of the first client device, wherein the touch gesture encircles the particular area;
   identify an item currently being presented in the particular area of the video content that is encircled by the touch gesture;
   formulate a textual search query based at least in part on the item that is identified;
   execute the search in a database to obtain a set of similar products based at least in part on text matching of the textual search query, a similarity of a respective product of the set of similar products being determined based at least in part on an analysis of history data for a plurality of users that indicates that views of the respective product are associated with views of the item, wherein the respective product is weighted based at least in part on a user profile and a price of the respective product; and
   cause a user interface to be rendered upon a second display of a second client device associated with the user, the user interface presenting search results comprising the item and the set of similar products.

2. The non-transitory computer-readable medium of claim 1, wherein the item comprises a location depicted in the video content.

3. The non-transitory computer-readable medium of claim 1, wherein when executed the program further causes the at least one computing device to at least:
   receive a selection of at least one of the search results from the user while the video content is being rendered; and
   add the at least one of the search results to a list of products associated with the user in response to the selection.

4. A system, comprising:
   at least one computing device; and
   a memory that stores at least one application executed in the at least one computing device, wherein when executed the at least one application causes the at least one computing device to at least:

detect a request from a user to initiate a search of an area of video content based at least in part on a touch gesture detected on a touch display, wherein the touch gesture encircles the area;

identify an item in the area of the video content that is encircled by the touch gesture, wherein the item is identified by determining dialogue in the video content and analyzing the dialogue to identify the item;

formulate a textual search query based at least in part on the item that is identified in the video content;

execute the search in a database to identify a set of similar items of an item catalog based at least in part on text matching the textual search query, a similarity of at least one of the set of similar items being determined based at least in part on an analysis of history data for a plurality of users that indicates that views of the at least one of the set of similar items is associated with views of the item; and cause search results comprising the item and the set of similar items to be presented to the user.

5. The system of claim 4, wherein when executed the at least one application further causes the at least one computing device to at least:

generate a first personalized result listing for the user for the search;

generate a second personalized result listing for another user for the search;

cause the first personalized result listing to be rendered by a first client device associated with the user;

cause the second personalized result listing to be rendered by a second client device associated with the other user; and wherein the first client device and the second client device are associated with a presentation of the video content by a third client device.

6. The system of claim 4, wherein the search results are presented to the user via an overlay rendered on top of the video content.

7. The system of claim 4, wherein the search results are presented to the user via a first client device when a second client device associated with the user is rendering the video content.

8. The system of claim 4, wherein when executed the at least one application further causes the at least one computing device to at least:

detect a selection of an interface component associated with music;

identify a music track featured in the video content; and generate an overlay on the video content that presents lyrics corresponding to the music track.

9. The system of claim 4, wherein the item corresponds to at least one product, and the search results correspond to a plurality of products that are available for order that are relevant to the item that is identified.

10. The system of claim 4, wherein an image analysis is performed on at least one current frame of the video content to identify the item.

11. The system of claim 10, wherein when executed the at least one application further causes the at least one computing device to obtain the at least one current frame from a client that is currently rendering the video content.

12. The system of claim 4, wherein detecting the request from the user to initiate the search relative to the video content further comprises receiving a user specification of a search region relative to a display of the video content, and wherein identifying the item in the video content further comprises performing an image analysis on the search region in at least one frame of the video content to identify the item.

13. The system of claim 4, wherein identifying the item in the video content further comprises:

performing an image analysis on the search region in at least one frame of the video content to identify the item.

14. A method, comprising:

rendering, via at least one computing device, video content upon a display;

while the video content is being rendered, detecting, via the at least one computing device, a request from a user to initiate a search of an area of the video content based at least in part on a touch gesture detected on a touch display, wherein the touch gesture encircles the area;

identifying, via the at least one computing device, an item currently being presented in the area of the video content that is encircled by the touch gesture;

formulating, via the at least one computing device, a textual search query based at least in part on the item that is identified in the video content;

executing, via the at least one computing device, the search in a database to generate at least one search result item based at least in part on text matching the textual search query, a similarity of a respective item of the at least one search result item being determined based at least in part on an analysis of history data for a plurality of users that indicates that views of the respective item are associated with views of the item, wherein the respective item is weighted based at least in part on a user profile and a price of the respective item; and causing, via the at least one computing device, the item and the at least one search result to be presented to the user.

15. The method of claim 14, wherein the item is one of a plurality of items currently being presented in the video content, and the method further comprises receiving, via the at least one computing device, a selection by the user of the item from the plurality of items.

16. The method of claim 14, wherein detecting the request from the user further comprises detecting, via a microphone, a voice command from the user.

17. The method of claim 14, wherein detecting the request from the user further comprises detecting, via a camera, a physical gesture performed by the user.

18. The method of claim 14, further comprising rendering, via the at least one computing device, the at least one search result item on the display.

19. The method of claim 14, wherein the at least one search result item is presented to the user while the video content is being rendered.

20. The method of claim 14, wherein identifying the item currently being presented further comprises:

determining dialogue in the video content; and analyzing the dialogue to identify the item.

\* \* \* \* \*